2,804,446

PRODUCTION OF WATER-SOLUBLE VINYL-TOLUENE-ACRYLIC ESTER COPOLYMER SULFONATES AND PRODUCTS OBTAINABLE THEREBY

Harold H. Roth, Bay City, Mich., assignor to The Dow Chemical Company, Midland, Mich., a corporation of Delaware No Drawing. Application August 4, 1954,
Serial No. 447,897

17 Claims. (Cl. 260—79.3)

This invention concerns the production of water-soluble sulfonates of certain resinous copolymers of vinyl-toluene and lower alkyl esters of acrylic acid and/or of methacrylic acid. It pertains more particularly to the sulfonation of such copolymers in chlorinated aliphatic hydrocarbon liquids and to certain of the products obtainable thereby.

This application is a continuation-in-part of a copending application, Serial Number 375,283, filed August 19, 1953.

Water-soluble sulfonates of certain solid, thermoplastic polymers of alkenyl aromatic compounds, e. g. polystyrene, have hitherto been prepared by dissolving such polymers in a liquid polychlorinated aliphatic hydrocarbon such as carbon tetrachloride and treating the solution with a highly reactive sulfonating agent such as chlorosulfonic acid. The properties of the product, e. g. the ease or completeness with which it can be dissolved or dispersed in water and its effectiveness in increasing the viscosity of water to which it is added, vary considerably with slight changes in one or more of the reaction conditions such as the kind or proportion of the sulfonating agent, the order or rate of mixing of the starting materials, and the reaction temperature. For these reasons, it is difficult, even when operating on a laboratory scale, to sulfonate successive batches of the polymer and obtain the same quality of sulfonated product. The difficulty of reproducing the results becomes greater as the quantity of material handled is increased, e. g. from laboratory amounts to a commercial scale. Many of the erratic results which have been obtained are attributed to occurrence of side reactions such as cleavage of the polymeric chain of the resin molecule and/or formation of sulfone-type cross-linkages between polymer molecules. These difficulties have been particularly acute with very high molecular weight polymeric materials, i. e. polymers whose molecular weights are substantially greater than those of commonly used molding grade resins.

In a copending application, Serial Number 272,888, filed February 21, 1952, by H. H. Roth, now U. S. Patent Number 2,691,644, it is disclosed that many of the above-mentioned difficulties involved in producing water-soluble sulfonated resins can be avoided by sulfonating polystyrene, or similar resins, with sulfur trioxide in the presence of a liquid mixed solvent consisting of a polychlorinated aliphatic hydrocarbon and sulfur dioxide. However, the polymers then tested could not be satisfactorily sulfonated to obtain water-soluble products when using either of the individual ingredients of said mixed solvent alone as the reaction medium. This fact is indicated in the application.

In the co-pending application, Serial Number 375,283, filed August 19, 1953, of which this application is a continuation-in-part, it is disclosed that a number of copolymers composed principally of alkenyl aromatic compounds can be satisfactorily sulfonated in the presence of liquid sulfur dioxide as a reaction medium to obtain water-soluble sulfonated resin products. Suitable such resinous copolymers are therein described as any alkenyl aromatic resin that can be dissolved, or dispersed, in liquid sulfur dioxide to form a clear or cloudy liquid body free from a distinct separate layer or precipitate. As examples of suitable copolymers which can be sulfonated with sulfur trioxide in liquid sulfur dioxide as a medium to obtain water-soluble resinous sulfonates there are mentioned copolymers of from 70 to 98 weight percent of styrene and from 30 to 2 percent acrylonitrile; copolymers of from 65 to 98 percent ar-vinyltoluene and from 35 to 2 percent acrylonitrile; copolymers of styrene, vinyltoluene and from 2 to 35 percent acrylonitrile; copolymers of from 60 to 75 percent alpha-methylstyrene, 20 to 25 percent acrylonitrile and 5 to 15 percent ethyl methacrylate; copolymers of styrene and sulfur dioxide; copolymers of from 68 to 95 percent of either or both of the compounds styrene and ar-vinyltoluene and from 5 to 32 percent of maleic anhydride; copolymers of from 60 to 87 percent of either or both of the compounds styrene and ar-vinyltoluene and from 13 to 40 percent of methyl methacrylate; the co-polymer of 75 percent styrene and 25 percent ethyl acrylate; and copolymers of styrene or ar-vinyltoluene with from 2 to 10 percent of methyl isopropenyl ketone.

It has now been found that there are a number of solid thermoplastic copolymers composed principally of ar-vinyltoluene, i. e., ar-methylstyrene, which can satisfactorily be sulfonated in the presence of a liquid chlorinated aliphatic hydrocarbon as a medium to obtain water-soluble sulfonated resin products. By "water-soluble" it is meant that the sulfonated resins can be dissolved, or dispersed, directly in water to form a substantially homogeneous liquid body, e. g. a true or colloidal solution thereof.

It has further been found that satisfactory water-soluble sulfonated ar-vinyltoluene copolymer products can be obtained without the necessity of using liquid sulfur dioxide. The use of liquid sulfur dioxide is often disadvantageous because low temperatures and/or elevated pressures and closed systems are usually required and because sulfur dioxide is a toxic substance.

It has further been found that certain copolymers of ar-vinyltoluene and alkyl esters of acrylic acid and/or methacrylic acid are more resistant to occurrence of the formation of cross-linkages between polymer molecules during sulfonation than are other known polymers and copolymers, e. g. the corresponding copolymers of styrene.

It has further been found that certain very high molecular weight copolymers of ar-vinyltoluene and alkyl esters of acrylic or methacrylic acid can be sulfonated to yield water-soluble, substantially non-crosslinked resin sulfonates. These resin sulfonates have unique properties which characterize them as novel and useful products, as fully described hereinafter.

Other features and advantages of the invention will be evident from the following description.

The solid, thermoplastic ar-vinyltoluene resins that can be reacted with sulfur trioxide in the presence of liquid chlorinated aliphatic hydrocarbons as the reaction medium to form water-soluble resin sulfonates are ones containing at least 55, but not more than 90, preferably from 55 to 85, percent by weight of ar-vinyltoluene chemically combined with at least 10, preferably from 15 to 45, percent of at least one alkyl ester of acrylic acid or methacrylic acid. Particularly suitable such esters which can be chemically combined in the ar-vinyltoluene copolymers in the proportions just given are the lower alkyl esters of acrylic acid and/or methacrylic acid, for example, methyl acrylate, ethyl acrylate, methyl methacrylate, and ethyl methacrylate and mixtures of two or more thereof. Such copolymers, and suitable methods for their preparation, are already known.

Such copolymers are exceptionally resistant to occurrence of the formation of cross-linkages between polymer molecules during sulfonation, yet are readily sulfonated with sulfur trioxide in a liquid chlorinated hydrocarbon medium to form water-soluble sulfonated resin products. Moreover, the quality of the sulfonated resin product can readily and repeatedly be reproduced by sulfonation of successive batches of polymer.

Liquid chlorinated aliphatic hydrocarbon suitable for use as media for the sulfonation of resinous polymers are ones which are substantially inert to chemical reaction with sulfur trioxide under conditions of sulfonation of the resinous polymer and are already known. Representative examples of such suitable liquid chlorinated aliphatic hydrocarbons are methylene chloride, chloroform, carbon tetrachloride, ethylene chloride, 1,1,1-trichloroethane, tetrachloroethylene, liquified methyl chloride and mixtures of such chlorinated aliphatic hydrocarbons in a liquid form. These chlorinated aliphatic hydrocarbons can be employed in the liquid form at atmospheric pressure at temperatures up to about 40° C., with the exception of methyl chloride and mixtures comprising the same. Media which consist of, or comprise, methyl chloride can be employed in the liquid form at atmospheric pressure at temperatures below about —25° C. and at higher temperatures at pressures greater than atmospheric pressure. Chlorinated aliphatic hydrocarbons in the liquid form which are usually preferred as media for the sulfonation of resinous polymers are liquified methyl chloride, methylene chloride, carbon tetrachloride, ethylene chloride and tetrachloroethylene. The chlorinated aliphatic hydrocarbon liquids are often preferably purified, e. g. by being contacted with sulfuric acid and distilled, prior to use as media for sulfonation, to free them of impurities which are reactive with sulfur trioxide.

The sulfonation reaction charge is usually prepared from a solution of one of the afore-mentioned copolymers in at least a portion of the liquid chlorinated aliphatic hydrocarbon medium. The solution usually contains 10 percent by weight or less, e. g. from 1 to 5 percent, of the copolymer. The sulfur trioxide is preferably diluted, e. g. with an equal weight or more of another portion of the liquid chlorinated aliphatic hydrocarbon medium. The reactant solutions, i. e. the polymer solution and the sulfur trioxide solution, may be admixed in any desired order. Preferably the polymer solution is added to the sulfur trioxide solution, or the two solutions are simultaneously added, in appropriate proportion, to a mixing and reaction zone containing a quantity of the liquid chlorinated aliphatic hydrocarbon or a quantity of a previously formed reaction product mixture. The proportions of sulfur trioxide solution and of copolymer resin solution which are admixed are such that at least 0.7, usually between 0.7 and 2, molecular equivalents of sulfur trioxide are added to an amount of the copolymer resin having one molecular equivalent of ar-vinyltoluene chemically combined therein, although the molecular ratio of sulfur trioxide to ar-vinyltoluene polymer can be as large as desired, e. g. ten or more. Preferably the total amount of liquid chlorinated aliphatic hydrocarbon used in preparing the various components of the reaction mixture is such that the weight of the sulfonated resin product corresponds to not more than 5, preferably from 0.5 to 3, percent by weight of the entire reaction mixture.

The sulfonation is accomplished at temperatures not higher than 40° C., usually between —20° and 40° C. In general, higher sulfonation temperatures give rise to an increased degree of side reactions, particularly cross-linking and chain scission, i. e. to the formation of greater numbers of sulfone linkages between polymer chains and to the cleavage of the carbon chain of the polymeric molecule. The cross-linking side reaction tends to increase the gross molecular weight of the resin sulfonate and tends to increase the solution viscosity of the sulfonated product. Contrarily, the chain scission side reaction tends to decrease the gross molecular weight and to lower the solution viscosity of the resin sulfonate. Of the copolymers of ar-vinyltoluene and alkyl acrylates or methacrylates herein described, those having relatively high proportions, e. g. from 85 to 90 percent by weight, of ar-vinyltoluene are more resistant to the chain scission side reaction, while being somewhat more susceptible to the sulfone cross-linking side reaction, than are those copolymers having lower proportions of ar-vinyltoluene. In other words, increasing the proportion of alkyl acrylate or methacrylate in the copolymer with ar-vinyltoluene tends to decrease the tendency of the sulfonation reaction to cause formation of sulfone cross-linkages while increasing somewhat the tendency to cause cleavage of the carbon chain of the copolymer molecule. Since the tendency of the sulfonation reaction to cause the formation of sulfone cross-linkages and to cause chain scission is greater at the higher temperatures, it is often desirable to carry out the sulfonation reaction at temperatures well below 40° C., e. g. in the range from —20° C. to room temperature, and preferably from —20° to about +5° C., in order to prepare substantially non-crosslinked linear resin sulfonates. However, the resin sulfonates prepared from the copolymers and in accordance with the broad teachings of the method herein described are water-soluble, although the properties of the resin sulfonates, and hence their preferred fields of utility, are dependent on the composition of the copolymer starting material and upon the procedure and conditions of the sulfonation reaction.

The sulfonation reaction occurs rapidly and the reactants may be admixed as rapidly as control of the reaction temperature will allow. The sulfonated resin copolymer product usually precipitates as small granules or particles slurried in the liquid medium. Usually it is advantageous to allow the reaction mixture to stand a short time, e. g. for 10–15 minutes, after complete admixing of the reactants. The solid resin sulfonic acid product can be separated from the liquid medium in usual ways, e. g. by filtering, decanting or centrifuging the mixture. The solid may be washed, e. g. with an additional portion of the chlorinated aliphatic hydrocarbon liquid or with an ether. The water-soluble copolymer resin sulfonic acid may thus be obtained directly in a solid granular form.

The water-soluble copolymer resin sulfonic acids may be neutralized in usual ways with alkalies such as ammonia, organic amines, sodium hydroxide or potassium hydroxide, to form salts thereof. The ammonium and alkali metal salts thus obtained are soluble in water to form true or colloidal solutions. These solutions are useful in the treatment of textile fibers and in the treatment of agricultural soils.

The following examples describe ways in which the invention has been practiced, but are not to be construed as limiting its scope. In the examples, parts and percentages are by weight unless otherwise noted.

*Example 1*

A high molecular weight copolymer of 30 parts by weight methyl methacrylate and 70 parts by weight ar-vinyltoluene, a solution of 1 part of which copolymer in 9 parts of toluene at room temperature had a viscosity of 2266 centipoises, was sulfonated in the following manner.

A quantity of commercial methylene chloride was purified by stirring the same vigorously in admixture with concentrated sulfuric acid at room temperature. After separation of the layers, the methylene chloride was flash-distilled. A liquid solution of 10 grams of the copolymer of ar-vinyltoluene and methyl methacrylate hereinbefore described and 400 mls. of the purified methylene chloride was added, with stirring and at room temperature, over a period of 10 minutes, to a liquid solution of 3.5 mls. of liquid sulfur trioxide in 670 mls. of the same kind of acid-treated methylene chloride. The resulting slurry was separated by filtration and the solid sulfonated polymer was washed with diethyl ether and dried under vacuum. A weighed portion of the solid sulfonated polymer was dissolved in water, titrated to neutrality with dilute aqueous sodium hydroxide and the neutral solution was adjusted to a concentration of 0.5 percent of the sodium salt of the sulfonated polymer. The viscosity of that aqueous solution was determined as 175 centipoises at room temperature.

In repeated tests using other portions of the starting polymer herein described and a similar sulfonation procedure, the viscosities of 0.5 percent solutions of the sodium salts of the polymer sulfonates in water were within the range from 175 to 262 centipoises.

*Example 2*

Another portion of the 70 percent ar-vinyltoluene and 30 percent methyl methacrylate copolymer described in Example 1 was sulfonated in solution in the acid-treated distilled methylene chloride, also described in Example 1, by the following procedure.

A liquid solution of 10 grams of the copolymer in 400 mls. of the methylene chloride and a liquid solution of 3.5 mls. of liquid sulfur trioxide in 400 mls. of the purified methylene chloride were fed together, at about equal rates by volume over about 10 minutes, into a reactor initially containing about 500 mls. of the methylene chloride at about room temperature. The resulting slurry was filtered, the solid sulfonated polymer was washed with ether, dried and a portion made into a 0.5 percent solution of the sodium salt in water as described in Example 1. The 0.5 percent solution of the sodium salt of the sulfonated polymer in water had a viscosity of 245 centipoises at room temperature.

In contrast to the experiments described in the previous examples, a polymer composed solely of polymerized ar-vinyltoluene was sulfonated. A 10 percent solution of this particular sample of polymerized ar-vinyltoluene starting material in toluene had a viscosity of 921 centipoises. A portion of that polymerized vinyltoluene was sulfonated with liquid sulfur trioxide in methylene chloride by a procedure similar to that described in Example 2. The resulting slurry was filtered, the solid sulfonated polymer was washed with ether and dried. A portion of the resin sulfonate was made into a 0.5 percent solution of the sodium salt in water as described in Example 1. The 0.5 percent solution of the sodium salt of the sulfonated polymeric vinyltoluene in water had a viscosity of about 15,500 at room temperature. From the solution viscosity of the original polymer starting material, it was expected that the viscosity of the 0.5 percent solution of the sodium polymer sulfonate in water would be in the order of about 140 centipoises. The actual value of 15,500 centipoises indicates that a considerable amount of cross-linking side reaction has occurred. Moreover, when repeated tests were made of the sulfonation of other portions of the same polymeric vinyltoluene in the same and different kind of chlorinated hydrocarbon solvent, the 0.5 percent solution viscosities of the sodium polymer sulfonates in water varied erratically from one test to another, e. g. from about 350 centipoises to more than 15,000 centipoises. The products varied from being water-soluble to being gels which were swellable by, but not soluble in, water.

These results of sulfonation of polymerized ar-vinyltoluene contrast with the results described in other of these examples where high molecular weight copolymers of ar-vinyltoluene and lower alkyl acrylates and methacrylates are sulfonated to form water-soluble polymer sulfonates whose sodium salt solutions in water have low and consistent viscosities which are indicative of products of a consistent, uniform chemical reaction substantially free of side reactions, especially cross-linking reactions.

*Example 3*

Other portions of the 70 percent ar-vinyltoluene and 30 percent methyl methacrylate copolymer described in Example 1 were sulfonated with liquid sulfur trioxide in carbon tetrachloride solvent by the same general procedure as follows:

Separate solutions of the copolymer in carbon tetrachloride and of liquid sulfur trioxide in carbon tetrachloride were prepared. Portions of these solutions were then fed concurrently to a quantity of carbon tetrachloride in the reaction vessel at room temperature. The relative proportions of polymer and of sulfur trioxide were such that about 1.4 molecular proportions of sulfur trioxide were added to an amount of polymer equivalent to one molecular proportion of vinyltoluene chemically combined therein. The total amount of carbon tetrachloride used in the tests was varied so that the proportion of sulfonated polymer product in the reaction mixture slurry at the end of the run differed from one test to another. The sulfonated polymer products were collected, washed with ether and dried as described in previous examples.

In Table I are shown the results of several such tests. All of the polymer sulfonates were water-soluble. The table shows, for each of three different tests, the approximate concentration of polymer sulfonic acid in the reaction mixture slurry at the end of the run and the viscosity in centipoises at 25° C. of the 0.5 percent solution in water of the sodium salt of the resulting sulfonated copolymer product.

TABLE I

| Concentration of Polymer Sulfonate in Slurry at End of Run | Viscosity, Centipoises, 0.5% Solution of Sodium Polymer Sulfonate in Water |
| --- | --- |
| 1% | 77 |
| 2% | 85 |
| 3% | 263 |

It appears from Table I that the 0.5 percent solution viscosity of the sodium polymer sulfonate in water increases sharply when the final concentration of sulfonated polymer is increased to about 3 percent in the reaction mixture slurry. Other tests with copolymers of ar-vinyltoluene and lower alkyl acrylates and methacrylates have shown that with copolymers having lower initial polymer molecular weights than that of the copolymer employed in this example higher concentrations of sulfonated polymer, e. g. up to about 5 percent of the reaction mixture at the end of the run, can be employed before appreciable increase is observed in the viscosity of the water solution of the sodium polymer sulfonate.

*Example 4*

High molecular weight copolymers of ar-vinyltoluene and methyl methacrylate were prepared in which different proportions of the copolymerizable monomers were chemically combined. In Table II are shown the proportions in percent by weight of methyl methacrylate (MMA) chemically combined in the copolymers with ar-vinyltoluene (VT) and the viscosity at 25° C. of a 10 percent solution of each starting copolymer in toluene.

Each of those copolymers was sulfonated in carbon tetrachloride at room temperature using the concurrent addition procedure described in Example 3. About 1.4 molecular proportions of sulfur trioxide were added to an amount of polymer starting material equivalent to one molecular proportion of ar-vinyltoluene chemically combined therein. The total amount of carbon tetrachloride used in each test was such that the concentration of sulfonated polymer in the reaction mixture slurry at the end of the run was about 1 percent. In Table II is also shown, for each test, the viscosity of a 0.5 percent by weight solution in water of the sodium salt of a portion of the sulfonated polymer.

TABLE II

| MMA in Copolymer with VT, percent | Viscosity, Centipoises, of 10% solution of Copolymer in Toluene | Viscosity, Centipoises, 0.5% solution of Sodium Polymer Sulfonate in Water |
| --- | --- | --- |
| (0, test following Example 2) | (921) | (15,500) |
| 10 | 1,587 | 3,620 |
| 20 | 1,313 | 110 |
| 30 | 2,266 | 77 |
| 30 | 1,226 | 57 |
| 40 | 2,024 | 110 |

It appears from Table II that the 0.5 percent solution viscosity of the sodium polymer sulfonate in water increases sharply when the proportion of methyl methacrylate in the copolymer is decreased to about 10 percent. Other tests have shown that lower viscosities of 0.5 percent solutions of sodium polymer sulfonates in water can be obtained with copolymers having as little as 10 percent methyl methacrylate chemically combined with vinyl toluene, provided that the initial molecular weight of the copolymer be lower than that of the copolymers employed in this example.

*Example 5*

A copolymer of 10 percent by weight methyl methacrylate and 90 percent ar-vinyltoluene, a solution of 10 percent of which copolymer in toluene had a viscosity of 5 centipoises at 25° C., was sulfonated. A solution of the polymer starting material in sulfuric acid-treated, distilled methylene chloride and a solution of liquid sulfur trioxide in another portion of the same solvent were added concurrently to a quantity of the purified methylene chloride, at room temperature, with stirring. About 1.4 molecular proportions of sulfur trioxide were added for each molecular proportion of vinyltoluene chemically combined in the copolymer. The total amount of methylene chloride used was such that the resulting sulfonated resin product was about 5 percent of the entire reaction mixture. A solution was prepared containing 0.5 percent of the sodium salt of a portion of the sulfonated copolymer. The viscosity of this solution was only slightly greater than the viscosity of water.

Another copolymer of 10 percent methyl methacrylate and 90 percent vinyltoluene, having a viscosity in 9 parts toluene of 10 centipoises at 25° C., was sulfonated by a procedure similar to that just described. The viscosity of a 0.5 percent solution in water of the sodium salt of a portion of the resulting sulfonated resin product was about 3 centipoises at 25° C.

*Example 6*

In a number of tests, portions of the 70 percent vinyltoluene and 30 percent methyl methacrylate copolymer described in Example 1 were sulfonated at different temperatures in carbon tetrachloride. About 1.4 molecular proportions of liquid sulfur trioxide in carbon tetrachloride solution were added concurrently with a solution in carbon tetrachloride of a quantity of the copolymer equivalent to one molecular proportion of vinyltoluene chemically combined therein to a quantity of carbon tetrachloride in the reactor. The total amount of carbon tetrachloride employed in each test was such that the polymer sulfonic acid product was about 1 percent by weight of the whole reaction mixture at the end of the run.

In Table III is shown the viscosity in centipoises of a solution in water of 0.5 percent by weight of the sodium salt of a portion of each of the sulfonated polymer products obtained at the reaction temperatures shown.

TABLE III

| Sulfonation Reaction Temperature, ° C. | Viscosity, Centipoises, 0.5% solution of Sodium Polymer Sulfonate, in water |
| --- | --- |
| 40 | 67 |
| 25 | 77 |
| 0 | 163 |
| −10 | 170 |

The slightly lower solution viscosities of the sodium polymer sulfonates obtained from reactions at higher temperatures may be presumed to be indicative of a slight tendency for scission of the polymer chain to accompany the sulfonation at such higher temperatures.

*Example 7*

A solution of 10 grams of the copolymer described in Example 1 in 200 mls. of tetrachloroethylene (previously purified by treatment with sulfuric acid and distilled) was added concurrently with a solution of 3.5 mls. of liquid sulfur trioxide in 200 mls. of the purified tetrachloroethylene to 345 mls. of that purified tetrachloroethylene, at room temperature with stirring. The addition required 15 minutes. The slurry was filtered, the solid washed with ether and dried. The solution in water of 0.5 percent of the sodium salt of a portion of the sulfonated resin had a viscosity at 25° C. of 400 centipoises.

In place of the copolymers of ar-vinyltoluene and methyl methacrylate employed in the foregoing examples, there can be substituted analogous copolymers in which all or part of the methyl methacrylate has been replaced by another lower alkyl ester of acrylic acid or of methacrylic acid such as methyl acrylate, ethyl acrylate, ethyl methacrylate or a mixture thereof.

*Example 8*

A high molecular weight copolymer was prepared consisting of 70 percent by weight ar-vinyltoluene and 30 percent by weight ethyl acrylate chemically combined therein. A 10 percent by weight solution of this copolymer in toluene had a viscosity at room temperature of 1,364 centipoises. A 10-gram portion of this copolymer was sulfonated at room temperature in carbon tetrachloride which had been previously purified by treatment with concentrated sulfuric acid and distilled. The polymer was sulfonated, with about 1.6 molecular proportions of liquid sulfur trioxide per one molecular proportion of vinyltoluene chemically combined in the copolymer, by a concurrent addition procedure using such a quantity of carbon tetrachloride that the resulting sulfonated polymer product was about 1 percent of the whole reaction mixture at the end of the run. The solid was separated from the slurry by filtration, washed with ether and dried. A portion of this sulfonated resin was converted to a 0.5 percent solution of the neutral sodium salt in water, which solution had a viscosity of 100 centipoises at room temperature.

Among the resin sulfonic acids prepared from ar-vinyltoluene copolymers were certain very high molecular weight, water-soluble products whose sodium salts in water solution had low viscosities. It has now been discovered that certain of these products are particularly valuable for use as, or in, agricultural soil conditioning agents, having the ability to aggregate clay soils and to increase the percolation rate of water through such soils. The particular class of resin sulfonates which have been found to have such outstanding value are those meeting the following specifications:

(a) Resin sulfonates derived from copolymer starting materials having very high molecular weights. Suitable starting copolymers are those whose 10 percent by weight solutions in toluene at 25° C. have viscosities greater than about 800 centipoises. Such viscosities correspond to molecular weights far greater than those of usual grades of thermoplastic resins used for molding purposes.

(b) Resin sulfonates whose sodium salt solutions at 0.5 percent by weight in water at 25° C. have viscosities of from about 65 to about 400 centipoises. Hitherto, such low viscosities have not been readily obtainable from very high molecular weight polymers. When, hitherto, such low viscosities have been obtained in resin sulfonates, those products have usually been obtained from starting resins having far lower molecular weights than are specified in (a) above.

Resin sulfonates meeting the specifications just described are provided in the resin sulfonates derived from copolymers of from 55 to 85 percent by weight ar-vinyltoluene and, correspondingly, 45 to 15 percent of an alkyl acrylate or methacrylate.

Specifically, those resin sulfonates, which are particularly valuable in conditioning soil, are ones derived from copolymers of from 55 to 85 percent by weight ar-vinyltoluene and, correspondingly, 45 to 15 percent of an alkyl acrylate or methacrylate, which starting copolymers are such as have viscosities, as 10 percent by weight solutions in toluene, of at least 800 centipoises, such copolymers having been sulfonated so that the resin sulfonates are linear, substantially non-crosslinked, water-soluble products whose sodium salts, as 0.5 percent by weight solutions in water, have viscosities of from about 65 to about 400 centipoises at 25° C. Such products can conveniently be made either by the method herein described or by the methods described in the co-pending applications, Serial Number 375,283, filed August 19, 1953, and Serial Number 272,888, filed February 21, 1952, now Patent No. 2,691,644.

The following tests are illustrative of the use of resin sulfonates of the kind just described in conditioning of soil.

A quantity of air-dried Miami silt loam soil was sieved through a ten-mesh screen. To 300 grams of the sieved soil was added 25 mls. of a water solution containing 0.15 gram of a resin sulfonic acid, corresponding to 0.05 percent by weight of the resin sulfonic acid based on the dry soil. The treated soil was placed in a standard soil percolation tube having an internal diameter of 1⅞ inches and a length of 10 inches. After ageing in the tube for 72 hours, the soil was saturated with water and placed under a constant head of water.

The total quantity of water percolating through the soil was measured over an 8-hour period and the average rate per hour was computed as a measure of the porosity of the soil sample. The height of soil in the tube was determined at the end of the test as a measure of the compaction of the soil during percolation.

After termination of the percolation test, the soil sample was allowed to drain for 16 hours, removed from the tube and weighed whereby the water retention was computed as the increase in weight per 100 grams of dry soil.

A 200-gram portion of the wet soil was then placed on a screen having a 32 mesh size and was agitated in a tank of water until all of the soil particles smaller than 32 mesh had washed out. Retained on the screen were those water-stable soil aggregates which were larger than about 0.5 mm., ranging generally from 0.5 mm. to 5 mm. in size. After draining for 5 minutes on the screen, these wet aggregates were weighed and the amount thereof per 100 grams of wet soil sample initially taken was computed.

In Table IV, the results of soil tests, carried out in accordance with the foregoing description, are described for several soil samples, including tests of three different resin sulfonic acids, identified as resin sulfonic acid A, B and C, respectively, and control tests of soils without any added resin sulfonic acid. Resin sulfonic acids A and B were tested in portions of the soil corresponding to control 1, while resin sulfonic acid C was tested in a portion of the soil corresponding to control 2.

TABLE IV

| Test Agent | Percolation Rate in cc./hr. Average | Water-Stable Aggregates, Wet weight per 100 of Wet soil | Water Retention, Weight gain per 100 of dry soil | Soil Height after Percolation, Inches |
|---|---|---|---|---|
| None; Control 1 | 52 | 16.0 | 30.0 | 4.75 |
| Resin Sulfonic Acid A | 1,240 | 57.5 | 32.7 | 5.50 |
| Resin Sulfonic Acid B | 1,320 | 55.5 | 36.0 | 5.62 |
| None; Control 2 | 81 | 19.0 | 32.7 | 4.87 |
| Resin Sulfonic Acid C | 2,254 | 58.0 | 43.7 | 5.37 |

The resin sulfonic acid identified as A in Table IV is the product of one of the sulfonation tests described hereinbefore in Example 6, being the product of sulfonation in carbon tetrachloride at −10° C. The starting polymer sulfonated was a copolymer of 70 percent by weight ar-vinyltoluene and 30 per cent by weight methyl methacrylate. The viscosity at 25° C. of a solution in toluene containing 10 percent by weight of that starting copolymer was 2266 centipoises. The water solution containing 0.5 percent by weight of the sodium salt of the pure resin sulfonic acid product had a viscosity at 25° C. of 170 centipoises.

The resin sulfonic acid identified as B in Table IV is the product of sulfonation in carbon tetrachloride at 0° C. by a procedure similar to that described in Example 6. The starting polymer employed to make resin sulfonic acid B was a copolymer of 70 percent by weight ar-vinyltoluene and 30 percent by weight methyl methacrylate. A solution of 10 percent by weight of that starting copolymer in toluene at 25° C. had a viscosity of 1226 centipoises. The solution in water of 0.5 percent by weight of the sodium salt of the pure resin sulfonic acid product had a viscosity at 25° C. of 133 centipoises.

The resin sulfonic acid identified as C in Table IV is the product of sulfonation of a starting copolymer of 70 percent by weight ar-vinyltoluene and 30 percent by weight methyl methacrylate, a solution of 10 percent by weight of that starting copolymer in toluene having a viscosity at 25° C. of 2266 centipoises (a portion of the same copolymer employed in making resin sulfonic acid A). The copolymer was sulfonated by the following procedure. A solution of 25 grams of the copolymer starting material was prepared in 400 mls. of liquid sulfur dioxide. A separate solution of 8.7 mls. of liquid sulfur trioxide in 400 mls. of liquid sulfur dioxide was prepared. These two solutions were fed concurrently over a ten-minute period to a reaction vessel initially containing 500 mls. of liquid sulfur dioxide. The mixture in the reaction vessel was held at −10° C. (atmospheric pressure, reflux of sulfur dioxide) and was vigorously stirred during the admixing of reactants and for 15 minutes after the admixture was complete. The resulting slurry was filtered and the solid resin sulfonic acid product was washed with diethyl ether and dried in vacuo. A one-gram portion of the resin sulfonic acid in water solution required 3.6 mls. of 1.0 N sodium hydroxide solution to effect neutralization. A 0.5 percent by weight solution of the sodium resin sulfonate in water had a viscosity at 25° C. of 117 centipoises.

The sulfonated copolymers herein described have a peculiar property, characteristic of solutions of this class of sulfonated copolymers in water, wherein the viscosities of such solutions decrease on prolonged standing and/or heating. The magnitude of this "viscosity drift" tendency differs among the sulfonated copolymers herein described. In general, there is an increased tendency to undergo a viscosity drift in those products derived from copolymers having a larger proportion of alkyl acrylate or methacrylate. Also, tendency for viscosity drifting is greater in those sulfonates in which the starting polymer has been subjected to a greater degree of chain scission during the sulfonation reaction. It is not known by what mechanism treatment of these copolymer sulfonates in water results in a lowering of the viscosity of the solution. However, such a property makes possible the use of these copolymer sulfonates in aqueous solution where it is required that the viscosity of the solution, after elapse of time and with or without heating, become substantially lower than the initial viscosity. For example, in compounding temporary suspensions of insoluble materials, such as clays, in watery media, these sulfonates assist in thickening the water phase initially and, after undergoing a decrease in viscosity, subsequently permit the temporary suspensions to be readily separated. Dye pastes can be compounded into thickened compositions with these copolymer sulfonates, applied to fabrics and boiled, whereupon the viscosity of the resin sulfonate decreases and the water-soluble material is readily washed out. For such purposes, use can be made of resin sulfonates of a wider range of composition than herein described for use in conditioning soils. For use as temporary viscosity modifiers, having the property in water solutions of undergoing a decrease in viscosity on standing and/or heating, suitable polymer sulfonates are ones derived from polymer starting materials which are copolymers of from 55 to 90 percent by weight ar-vinyltoluene and, correspondingly, from 45 to 10 percent of an alkyl acrylate or methacrylate, which copolymers, in 10 percent by weight solution in toluene, have viscosities at 25° C. greater than about 50 centipoises. The sodium salts of the corresponding sulfonated copolymers, as 0.5 percent by weight solutions in water, should preferably have viscosities at 25° C. of more than 30 centipoises. Of these, the most useful for thickening purposes are resin sulfonates whose sodium salt solutions in water at 0.5 percent concentration have high viscosities, e. g. above about 400 centipoises. However, the viscosity to which the water solution of such a resin sulfonate will diminish on ageing and/or heating is partially dependent on its initial viscosity, i. e. an initially high viscosity will generally not drift to as low a value as will one which is initially lower.

In Table V are illustrative examples of sulfonated polymers having the above-described property. In the table, the composition of the starting copolymer is shown as weight per cent of ar-vinyltoluene (VT) and of methyl methacrylate (MMA) or of ethyl acrylate (EA). The "copolymer viscosity" is the viscosity in centipoises of a 10 percent by weight solution of that starting copolymer in toluene at 25° C. The "viscosity of 0.5% sodium sulfonate" is the viscosity in centipoises of a solution of the neutral sodium salt of the purified copolymer sulfonic acid product at a concentration of 0.5 percent by weight in water at 25° C. The "remarks" show the viscosity, in centipoises at 25° C., of the 0.5 percent by weight solution of the sodium sulfonate after the indicated treatment.

TABLE V

| Copolymer Composition Weight Percent | Copolymer Viscosity, 10% in Toluene | Viscosity of 0.5% Sodium Sulfonate in Water Solution | Remarks Relative to the "Viscosity Drift" |
| --- | --- | --- | --- |
| 70 VT, 30 MMA | 1,226 | 705 | 4 cps. after 108 hours at 90° C. |
| 80 VT, 20 MMA | 1,313 | 75 | 8 cps. after 36 hours at 90° C. |
| 85 VT, 15 MMA | 902 | 850 | 100 cps. after 24 hours at 90° C. |
| 90 VT, 10 MMA | 1,587 | 165 | 100 cps. after 72 hours at 90° C. |
| 85 VT, 15 MMA | 902 | 193 | 55 cps. after 66 hours at 90° C. |
| 90 VT, 10 MMA | 51.6 | 70 | 11 cps. after 18 hours at room temperature; 4 cps. after 5 hours at 90° C. |
| 70 VT, 30 EA | 1,364 | 100 | 17 cps. after 2 hours at 90° C. |

Useful compositions are not restricted to the 0.5 percent by weight solutions of the sodium salts in water which are shown in Table V for purposes of illustration and comparison. Instead, the free copolymer sulfonic acids themselves can be employed, or these acids can be converted to water-soluble salts by reaction with alkalies such as ammonia, organic amines, and potassium hydroxide. Herein the terms "resin sulfonates" and "copolymer sulfonates" are intended to include the free sulfonic acids and water-soluble salts thereof. Furthermore, useful compositions are obtainable with concentrations of soluble copolymer sulfonates from a mere trace to 10 or more percent by weight in water or in watery media.

I claim:

1. A method for the production of substantially non-crosslinked, water-soluble resin sulfonates which comprises admixing sulfur trioxide with a solid, thermoplastic copolymer of from 55 to 90 parts by weight ar-vinyltoluene and from 45 to 10 parts by weight of at least one ester selected from the group consisting of methyl acrylate, ethyl acrylate, methyl methacrylate, and ethyl methacrylate at a reaction temperature not higher than 40° C. while having the reactants dissolved in methylene chloride.

2. A method according to claim 1 wherein at least 0.7 molecular proportion of sulfur trioxide is admixed with a quantity of the copolymer containing one molecular equivalent of ar-vinyltoluene chemically combined therein and the proportion of methylene chloride is such that the combined weight of the sulfur trioxide and the copolymer does not exceed 5 percent by weight of the entire mixture.

3. A method according to claim 2 wherein the copolymer employed contains from 55 to 90 parts by weight of ar-vinyltoluene chemically combined with from 45 to 10 parts by weight of methyl methacrylate.

4. A method according to claim 2 wherein the copolymer employed contains from 55 to 90 parts by weight of ar-vinyltoluene chemically combined with from 45 to 10 parts by weight of ethyl acrylate.

5. A method according to claim 2 wherein the operations are accomplished by forming a liquid solution of the sulfur trioxide in a portion of the methylene chloride, forming a separate liquid solution of the copolymer in another portion of the methylene chloride and passing the two solutions into admixture with one another while stirring and maintaining the resultant mixture at temperatures between −20 and 40° C.

6. A method according to claim 5 wherein the copolymer employed contains from 55 to 90 parts by weight of ar-vinyltoluene chemically combined with 45 to 10 parts by weight of methyl methacrylate.

7. A method for the production of substantially non-crosslinked, water-soluble resin sulfonates which comprises sulfonating a solid, thermoplastic copolymer by admixing the copolymer with sulfur trioxide at a reaction temperature between −20° and +5° C. while having the reactants dissolved in methylene chloride, said copolymer being a copolymer of from 55 to 85 parts by weight of ar-vinyltoluene and from 45 to 15 parts by weight of at least one ester selected from the group consisting of methyl acrylate, ethyl acrylate, methyl methacrylate, and ethyl methacrylate, said copolymer being soluble in nine times its weight of toluene to form a solution having a viscosity at 25° C. of more than 800 centipoises, the proportion of sulfur trioxide and said copolymer being such that there is at least 0.7 molecular proportion of sulfur trioxide for each molecular proportion of ar-vinyltoluene chemically combined in the copolymer, and the proportion of methylene chloride being such that the combined weight of the sulfur trioxide and the copolymer does not exceed 3 percent by weight of the entire mixture.

8. A method according to claim 7 wherein the copolymer is a copolymer of from 55 to 85 parts by weight of ar-vinyltoluene and from 45 to 15 parts by weight of methyl methacrylate.

9. A method according to claim 7 wherein the operations are accomplished by forming a liquid solution of the sulfur trioxide in a portion of the methylene chloride, forming a separate liquid solution of the copolymer in another portion of the methylene chloride and passing the two solutions into admixture with one another while stirring the resultant mixture.

10. A method according to claim 9 wherein the copolymer is a copolymer of from 55 to 85 parts by weight of ar-vinyltoluene and from 45 to 15 parts by weight of methyl methacrylate.

11. A substantially non-crosslinked, water-soluble copolymer resin sulfonate derived from a copolymer of from 55 to 90 percent by weight of ar-vinyltoluene and from 45 to 10 percent by weight of at least one ester selected from the group consisting of methyl acrylate, ethyl acrylate, methyl methacrylate, and ethyl methacrylate, a solution of which copolymer in nine times its weight of toluene at 25° C. has a viscosity of more than 50 centipoises, which water-soluble copolymer resin sulfonate has from 0.7 to 2.0 sulfonic acid groups per molecular equivalent of ar-vinyltoluene chemically combined therein, a solution of the natural sodium copolymer resin sulfonate at a concentration of 0.5 percent by weight in water in water at 25° C. having a viscosity of more than 30 centipoises.

12. A substantially non-crosslinked, water soluble copolymer resin sulfonate according to claim 11 derived from a copolymer of from 55 to 90 percent by weight of ar-vinyltoluene and from 45 to 10 percent by weight of methyl methacrylate.

13. A substantially non-crosslinked, water-soluble copolymer resin sulfonate derived from a copolymer of from 55 to 85 percent by weight of ar-vinyltoluene and from 45 to 15 percent by weight of at least one ester selected from the group consisting of methyl acrylate, ethyl acrylate, methyl methacrylate, and ethyl methacrylate, a solution of which copolymer in nine times its weight of toluene at 25° C. has a viscosity of more than 800 centipoises, which water-soluble copolymer resin sulfonate has from 0.7 to 2.0 sulfonic acid groups per molecular equivalent of ar-vinyltoluene chemically combined therein, a solution of the neutral sodium resin sulfonate at a concentration of 0.5 percent by weight in water at 25° C. having a viscosity of from 65 to 400 centipoises.

14. A substantially non-crosslinked, water-soluble copolymer resin sulfonate according to claim 13 derived from a copolymer of from 55 to 85 percent by weight of ar-vinyltoluene and from 45 to 15 percent by weight of methyl methacrylate.

15. A substantially non-crosslinked, water-soluble copolymer resin sulfonate according to claim 13 derived from a copolymer of from 55 to 85 percent by weight of ar-vinyltoluene and from 45 to 15 percent by weight of ethyl acrylate.

16. A substantially non-crosslinked, water-soluble copolymer resin sulfonate derived from a copolymer of from 55 to 90 percent by weight of ar-vinyltoluene and from 45 to 10 percent by weight of at least one ester selected from the group consisting of methyl acrylate, ethyl acrylate, methyl methacrylate, and ethyl methacrylate, a solution of which copolymer in nine times its weight of toluene at 25° C. has a viscosity of more than 800 centipoises, which water-soluble copolymer resin sulfonate has from 0.7 to 2.0 sulfonic acid groups per molecular equivalent of ar-vinyltoluene chemically combined therein, a solution of the neutral sodium resin sulfonate at a concentration of 0.5 percent by weight in water at 25° C. having a viscosity of more than 400 centipoises.

17. A substantially non-crosslinked, water-soluble copolymer resin sulfonate according to claim 16 derived from a copolymer of from 55 to 90 percent by weight of ar-vinyltoluene and from 45 to 10 percent by weight of methyl methacrylate.

References Cited in the file of this patent

UNITED STATES PATENTS

| | | |
|---|---|---|
| 2,640,820 | Teot | June 2, 1953 |
| 2,678,306 | Ferris | May 11, 1954 |